United States Patent [19]
Khuu

[11] Patent Number: 6,028,737
[45] Date of Patent: Feb. 22, 2000

[54] REMOVABLE DRIVE COVER HAVING FLUSH SURFACE

[75] Inventor: Hong Khuu, Fremont, Calif.

[73] Assignee: Castlewood Systems, Inc., Pleasanton, Calif.

[21] Appl. No.: 09/047,890

[22] Filed: Mar. 25, 1998

[51] Int. Cl.[7] .............................. G11B 17/04; G11B 33/02
[52] U.S. Cl. ...................... 360/99.06; 369/77.2; 369/75.1
[58] Field of Search ............................... 360/99.02, 97.02, 360/92.06, 97.04; 369/77.2, 75.1, 75.2, 77.1

[56] References Cited

U.S. PATENT DOCUMENTS

| | | | |
|---|---|---|---|
| D. 375,728 | 11/1996 | Nicklos et al. ......................... | D14/114 |
| 4,396,963 | 8/1983 | Wright ...................................... | 360/97 |
| 5,351,228 | 9/1994 | Kanno et al. ........................... | 369/77.2 |
| 5,481,520 | 1/1996 | Tokoro ..................................... | 369/77.2 |
| 5,668,793 | 9/1997 | Ogawa et al. .......................... | 369/77.2 |

*Primary Examiner*—David D. Davis
*Attorney, Agent, or Firm*—Townsend and Townsend and Crew LLP

[57] ABSTRACT

An apparatus for use with a removable disk drive system. The apparatus provides a fastening frame (105) with an access portion (107) or opening. Disposed over the access portion is an access panel or door (100). The access panel (100) is coupled to the fastening frame (105) using coupling members (120). The coupling members (120) are mounting supports adapted to be flush with the access panel (100) such that when the access panel is integrated in to the fastening frame (105), the coupling members do not extend outward from the surface of the apparatus. A recess means (130) is defined on the access panel.

10 Claims, 12 Drawing Sheets

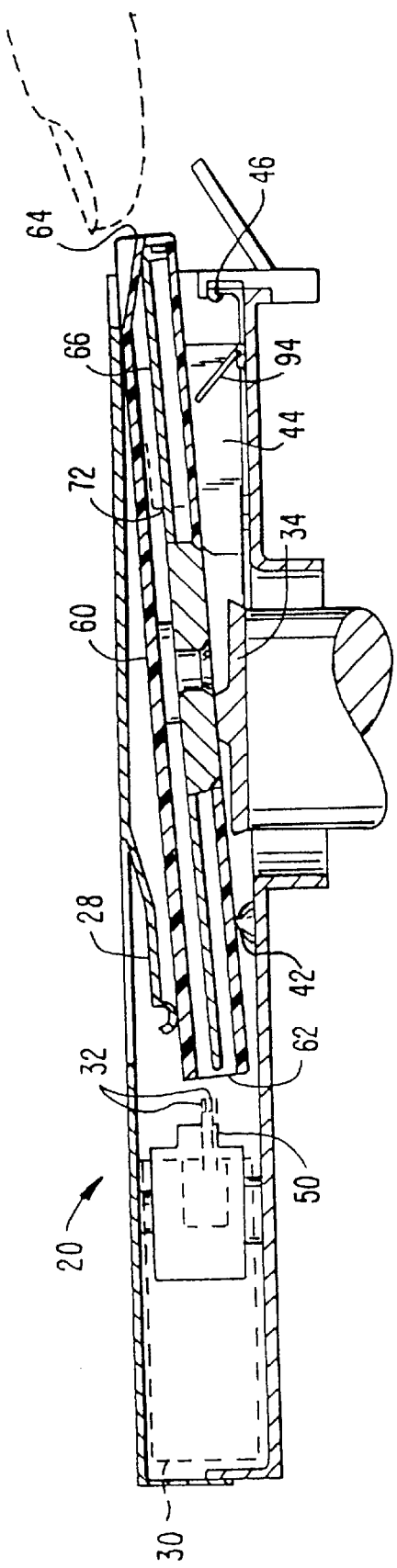
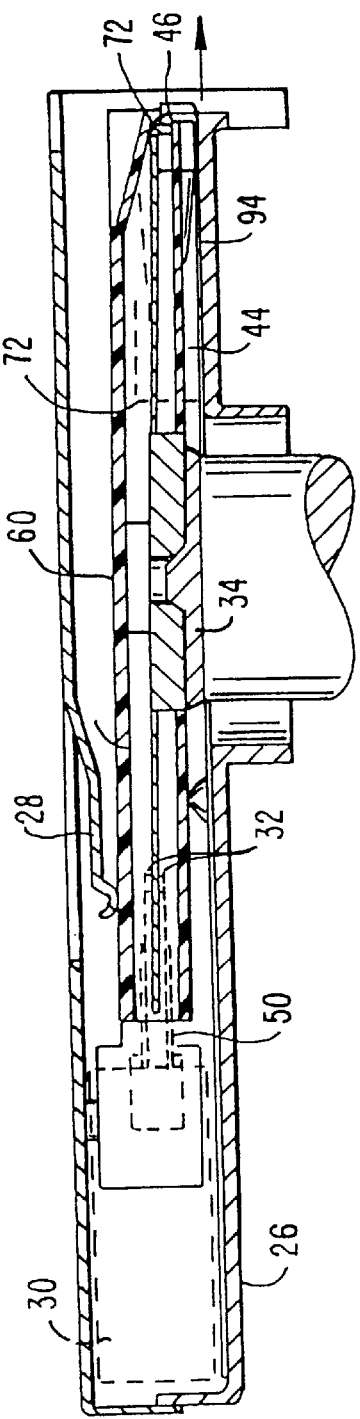
FIG. 6B.
FIG. 7A.

REMOVABLE DRIVE COVER HAVING FLUSH SURFACE

BACKGROUND OF THE INVENTION

The present invention is generally related to recording systems for digital video, and in particular, provides an access panel having a flush surface for a removable disk drive.

Video Cassette Recorders ("VCRs") dominate the consumer video market, due in part to their combination of low cost and recording capabilities. VCR analog magnetic tape recording cassettes can be used to record, play-back, and store video images in a format which is well adapted for use with existing analog television signals. The ability to record allows consumers to use the standard VHS VCR to save television shows and home movies, as well as for play-back of feature films.

The structure of VCR systems and recording media is adapted to record and archive existing television signals. Specifically, a large amount of analog data is presented on a standard television screen during a standard length feature film. VCR systems record this analog data using analog recording media. The VCR recordings can be removed from the recording/play-back equipment for storage, thereby reducing the system costs when large numbers of movies are stored.

While VCR systems successfully provide recording and archive capabilities at low cost, these existing consumer video systems have significant disadvantages. For example, accessing selected portions of a movie stored on a VCR tape can be quite slow and cumbersome. In particular, the cassette must be rewound to the beginning of the movie between each showing, which can involve a considerable delay. Additionally, transferring data to and from the tape takes a substantial amount of time. Although it would be beneficial to provide high speed accessing and transfer of the video data, this has remained a secondary consideration, as movies are typically recorded and played by the consumer in real time. Alternatives providing faster access are commercially available (for example, optical video disks), but these alternatives generally have not been able to overcome the VCR's low cost and recording capabilities.

Recent developments in video technology may further decrease the VCR's advantages over alternative systems. Specifically, standard protocols have recently been established for High Definition TeleVision ("HDTV") signals. The digital data presented in a single HDTV feature film using these protocols can represent a substantial increase over existing VCR system capacities. While digital video cassette tapes are available, these modified versions of existing analog VCR systems do not appear to have sufficient storage capacity for a feature film in all of the proposed HDTV formats. Optical disks can accommodate these larger quantities of digital data. Unfortunately, despite many years of development, a successful low cost optical recording system has remained an elusive goal.

Personal computer magnetic data storage systems have evolved with structures which are quite different than consumer video storage systems. Modern personal computers often include a rigid magnetic disk which is fixed in an associated disk drive. These hard disk drive systems are adapted to access and transfer data to and from a recording surface of the disk at high speeds. It is generally advantageous to increase the total data storage capacity of each hard disk, as the disks themselves are typically fixed in the drive system. Hence, much of the data that is commonly used by the computer is stored on a single disk.

The simplicity provided by such a fixed disk drive system helps maintain overall system reliability, and also helps reduce the overall storage system costs. Nonetheless, removable hard disk cartridge systems have recently become commercially available, and are now gaining some acceptance. While considerable computer data can be stored using these removable hard disk cartridge systems, their complexity, less than ideal reliability, and cost has limited their use to selected numbers of high-end personal computer users.

One particular disadvantage of known removable hard disk computer storage systems is a need to ensure that the internal working mechanisms of the disk drive system are free from environmental contamination and external interference.

SUMMARY OF THE INVENTION

In an aspect of the invention, the apparatus provides a fastening frame with an access portion or opening. Disposed over the access portion is an access panel or door. The access panel is coupled to the fastening frame using coupling members. The coupling members are mounting supports adapted to be flush with the access panel such that when the access panel is integrated in to the fastening frame, the coupling members do not extend outward from a surface of the frame. A recess means is defined on the access panel.

In another aspect, an apparatus is provided which can be used with a disk drive system. The apparatus has a fastening frame. The fastening frame has an access portion which is defined by the lateral walls of the frame. The lateral walls are formed of lateral strips disposed inward of the access portion. The walls also have recessed portions which are disposed at the inner sides of the access portion. An access panel is disposed over the access portion and is received within the inner recessed area of the fastening frame. The access panel has at least two coupling members which extend from a bottom edge of the frame. The front face of each coupling member is flush with the front surface of the access panel. A hinge is provided for supporting the access panel and providing pivotal movement about an axis. The hinge has pivot rods coupled to a lateral wall of the fastening frame. The coupling members are coupled to the pivot rods. When mounted to the fastening frame, the coupling members and the access panel are completely flush or are on the same plane with an outward surface of the fastening frame. The access panel has a recess means defined which provides clearance. The recess means is defined by an outer curved surface which is substantially arc shaped and extends substantially parallel to a peripheral edge of the fastening frame. The access panel has a means for biasing the access panel in a closed position.

BRIEF DESCRIPTION OF THE DRAWINGS

FIG. 6B is a cross-sectional side view of the cartridge being inserted into the internal drive of FIG. 1B.

FIG. 7A is a cross-sectional side view of the cartridge of FIG. 3 fully inserted into the internal drive of FIG. 1B.

DESCRIPTION OF A SPECIFIC EMBODIMENT

Figure 1:
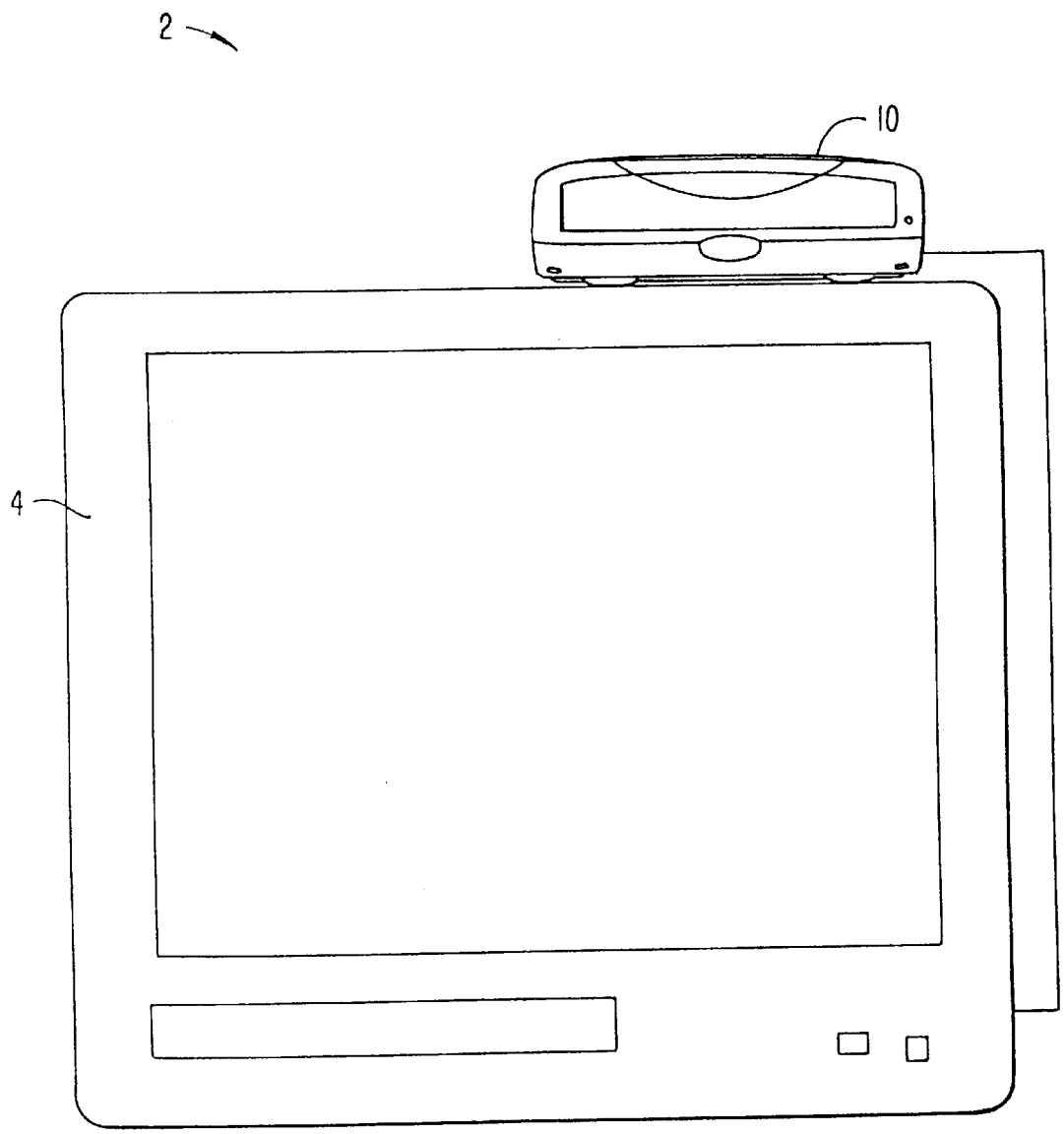
FIG. 1 is a schematic illustration of a video system including a high definition television and an external disk drive.

As schematically illustrated in FIG. 1, a video system 2 includes a high definition television 4 which is coupled to an external disk drive 10. External drive 10 will read recorded digital data from a removable disk cartridge, and will transmit that data to HDTV 4, preferably using one of the standard digital formats or protocols now being established. No general purpose computer need be coupled between external drive 10 and HDTV 4, although such a general purpose computer may be incorporated into video system 2 to allow flexible manipulation of the video data. In the exemplary embodiment, external drive 10 is less than 2 in. by less than 5½ in. by less than 7 in. The small size of the drive (and the small size of the disks on which the movies are stored) helps decrease the overall space which is required for video systems and the associated movie library.

Figure 1A:
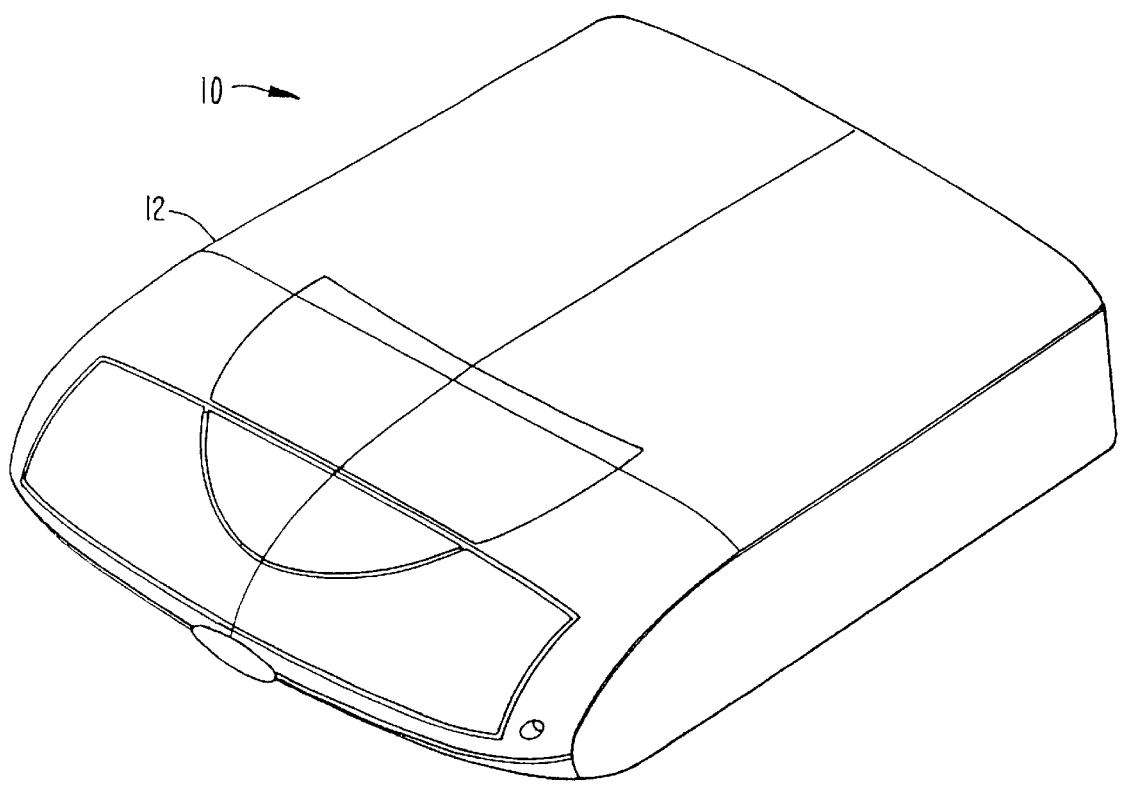
FIG. 1A is a perspective view of an external disk drive for use with a removable rigid recording disk cartridge, according to the principles of the present invention.
Figure 1B:
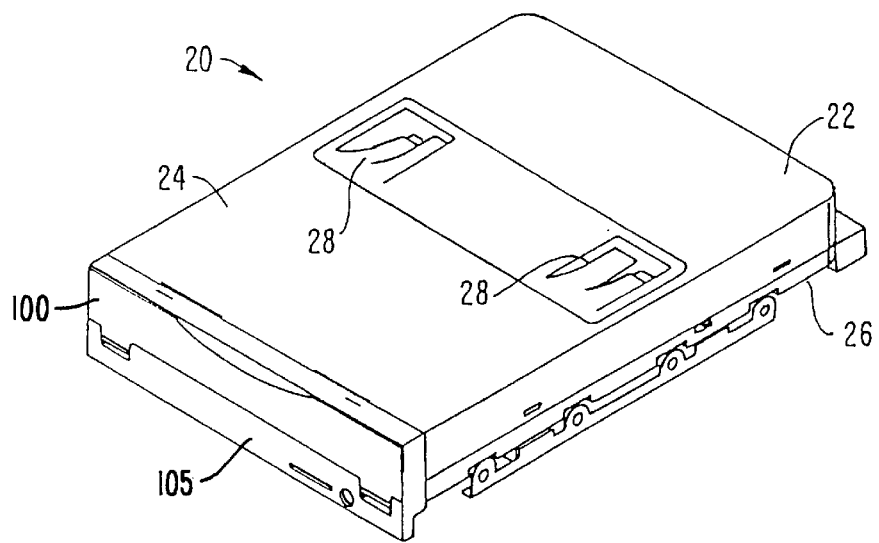
FIG. 1B is a perspective view of an internal disk drive similar to the external drive of FIG. 1, in which the internal drive is adapted for insertion into a standard bay of a computer.

Referring now to FIGS. 1A and 1B, external disk drive 10 and internal disk drive 20 will share many of the same components. However, external drive 10 will include an enclosure 12 adapted for use outside a personal computer, high definition television, or some other data manipulation or display device. Additionally, external drive 10 will include standard I/O connectors, parallel ports, and/or power plugs similar to those of known computer peripheral or video devices.

Internal drive 20 will typically be adapted for insertion into a standard bay of a computer. In some embodiments, internal drive 10 may instead be used within a bay in a HDTV, thereby providing an integral video system. Internal drive 20 may optionally be adapted for use with a bay having a form factor of 2.4 inches, 1.8 inches, 1 inch, or with any other generally recognized or proprietary bay. Regardless, internal drive 20 will typically have a housing 22 which includes a housing cover 24 and a base plate 26. As illustrated in FIG. 1B, housing 24 will typically include integral springs 28 to bias the cartridge downward within the receiver of housing 22. It should be understood that while external drive 10 may be very different in appearance than internal drive 20, the external drive will preferably make use of base plate 26, cover 24, and most or all mechanical, electromechanical, and electronic components of internal drive 20.

Figure 2:
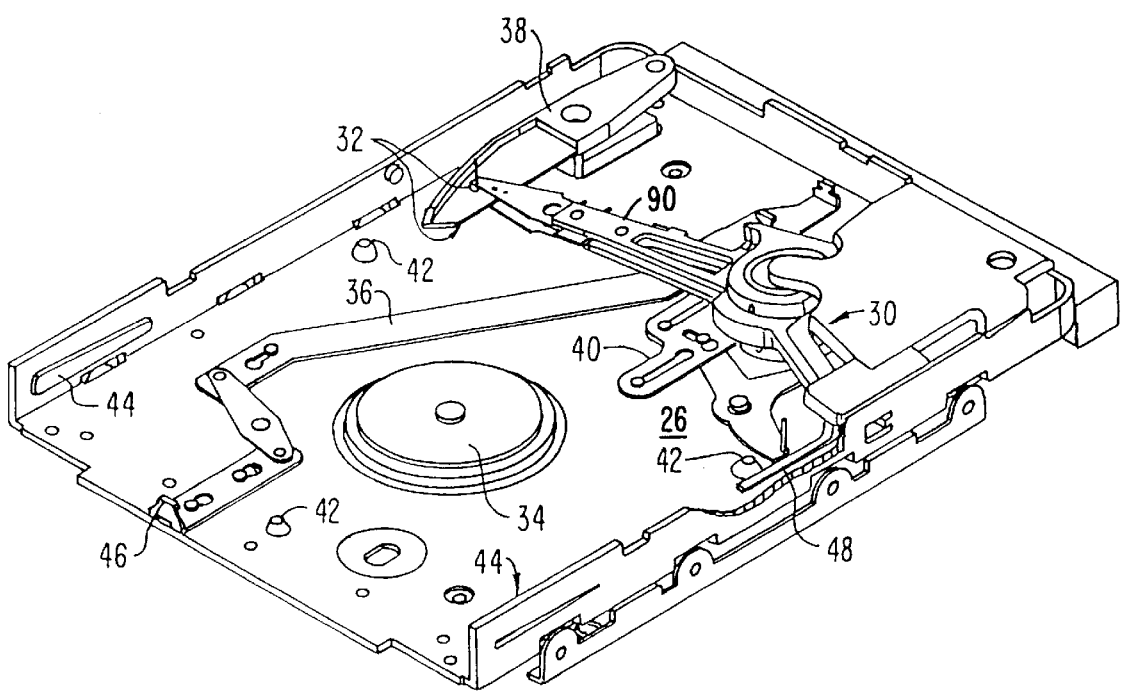
FIG. 2 is a perspective view of the internal disk drive of FIG. 1B, in which a cover of the disk drive has been removed to show a receptacle for the removable cartridge and some of the major disk drive components.

Many of the components of internal drive 20 are visible when cover 22 has been removed, as illustrated in FIG. 2. In this exemplary embodiment, a voice coil motor 30 positions first and second heads 32 along opposed recording surfaces of the hard disk while the disk is spun by spindle drive motor 34. A release linkage 36 is mechanically coupled to voice coil motor 30, so that the voice coil motor effects release of the cartridge from housing 24 when heads 32 move to a release position on a head load ramp 38. Head load ramp 38 is preferably adjustable in height above base plate 26, to facilitate aligning the head load ramp with the rotating disk.

A head retract linkage 40 helps to ensure that heads 32 are retracted from the receptacle and onto head load ramp 38 when the cartridge is removed from housing 22. Head retract linkage 40 may also be used as an inner crash stop to mechanically limit travel of heads 32 toward the hub of the disk.

Base 26 preferably comprise a stainless steel sheet metal structure in which the shape of the base is primarily defined by stamping, the shape ideally being substantially fully defined by the stamping process. Bosses 42 are stamped into base 26 to engage and accurately position lower surfaces of the cartridge housing. To help ensure accurate centering of the cartridge onto spindle drive 34, rails 44 maintain the cartridge above the associated drive spindle until the cartridge is substantially aligned axially above the spindle drive, whereupon the cartridge descends under the influence of cover springs 28 and the downward force imparted by the user. This brings the hub of the disk down substantially normal to the disk into engagement with spindle drive 34. A latch 46 of release linkage 36 engages a detent of the cartridge to restrain the cartridge, and to maintain the orientation of the cartridge within housing 22.

Figure 3:
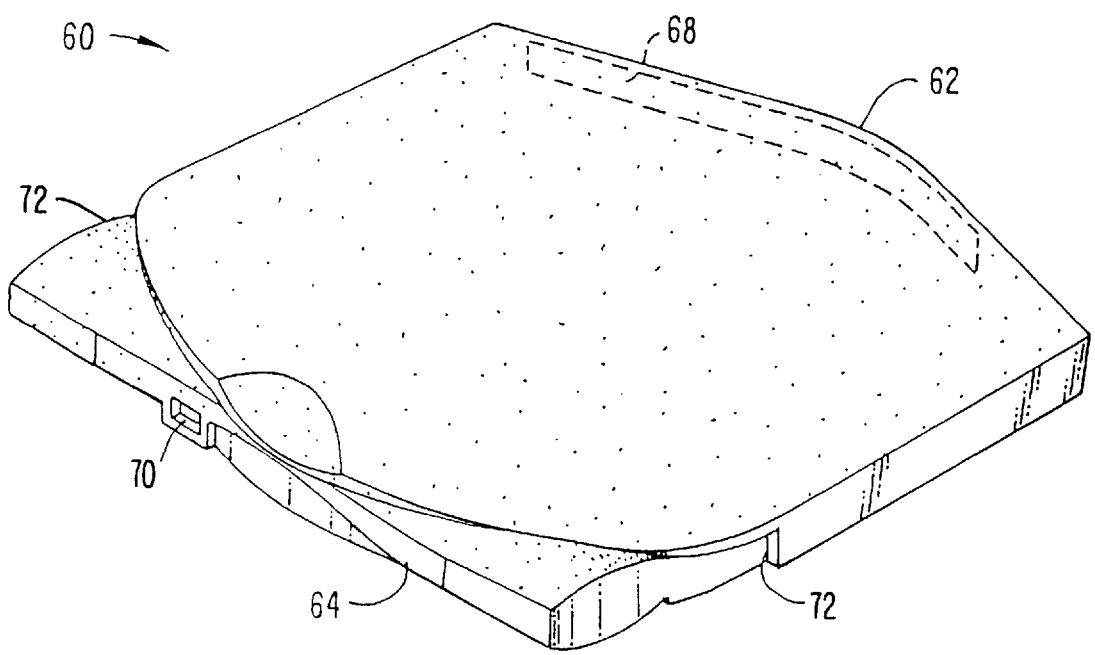
FIG. 3 is a perspective view of a removable cartridge housing a rigid magnetic recording disk.
Figure 3A:
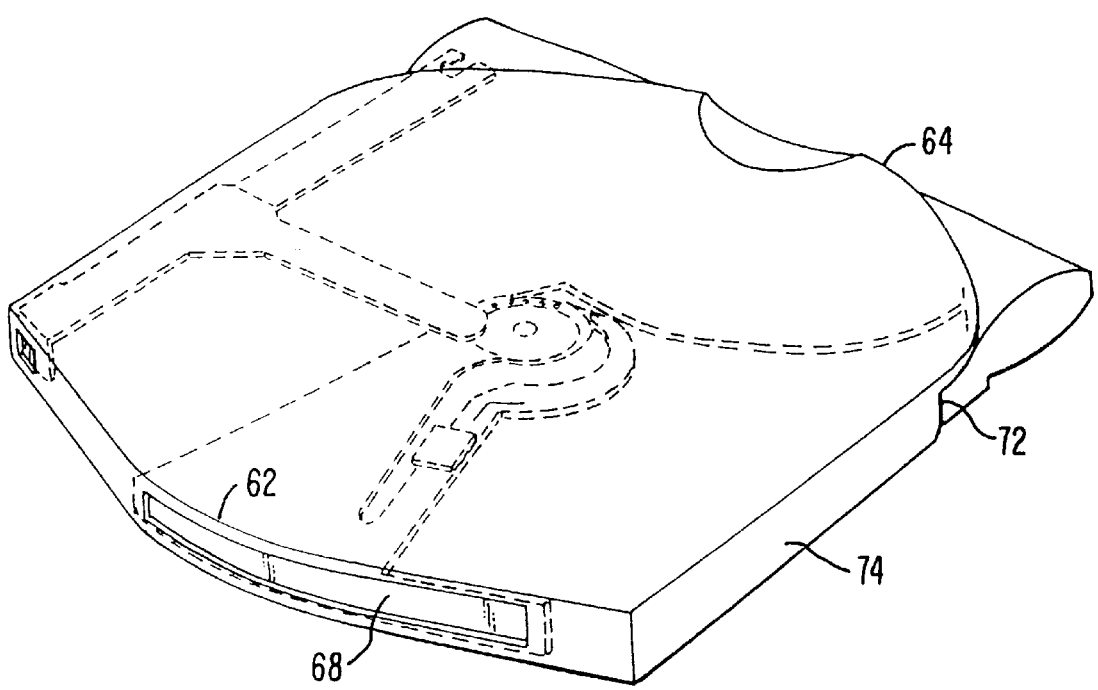
FIG. 3A is an alternative perspective view of the cartridge of FIG. 3, showing the door and door actuation mechanism.
Figure 7B:
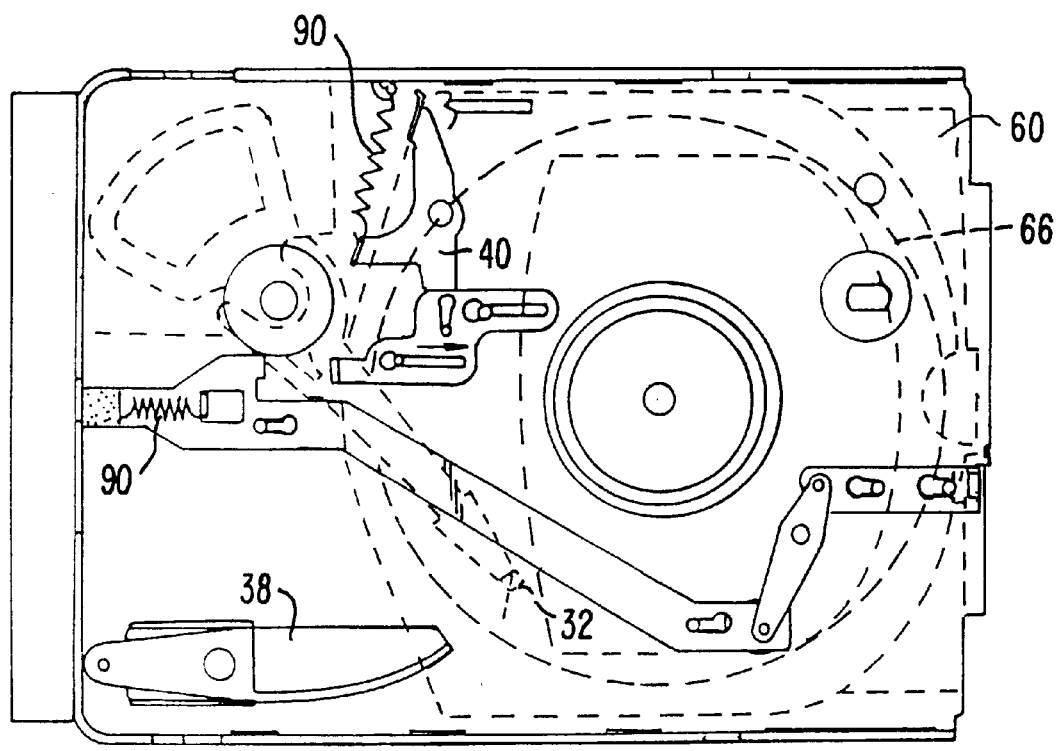
FIG. 7B is a top view of the cartridge inserted within the drive.
Figure 7C:
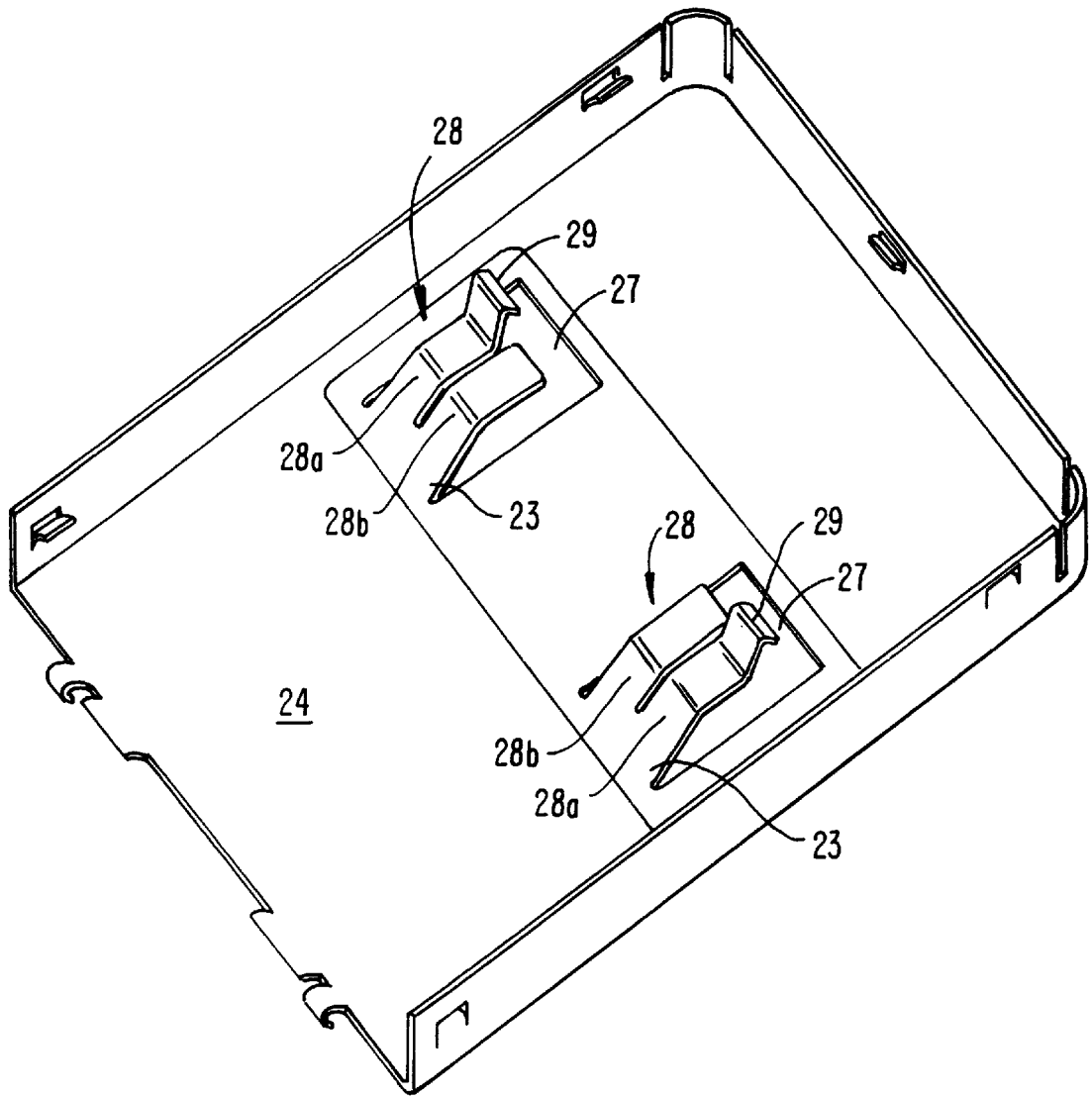
FIG. 7C is a perspective view of the disk drive housing cover showing integral springs.

A cartridge for use with internal drive 20 is illustrated in FIGS. 3 and 3A. Generally, cartridge 60 includes a front edge 62 and rear edge 64. A disk 66 (see FIG. 7B) is disposed within cartridge 60, and access to the disk is provided through a door 68. A detent 70 along rear edge 64 of cartridge 60 mates with latch 46 to restrain the cartridge within the receptacle of the drive, while rear side indentations 72 are sized to accommodate side rails 44 to allow cartridge 60 to drop vertically into the receptacle.

Figure 4:
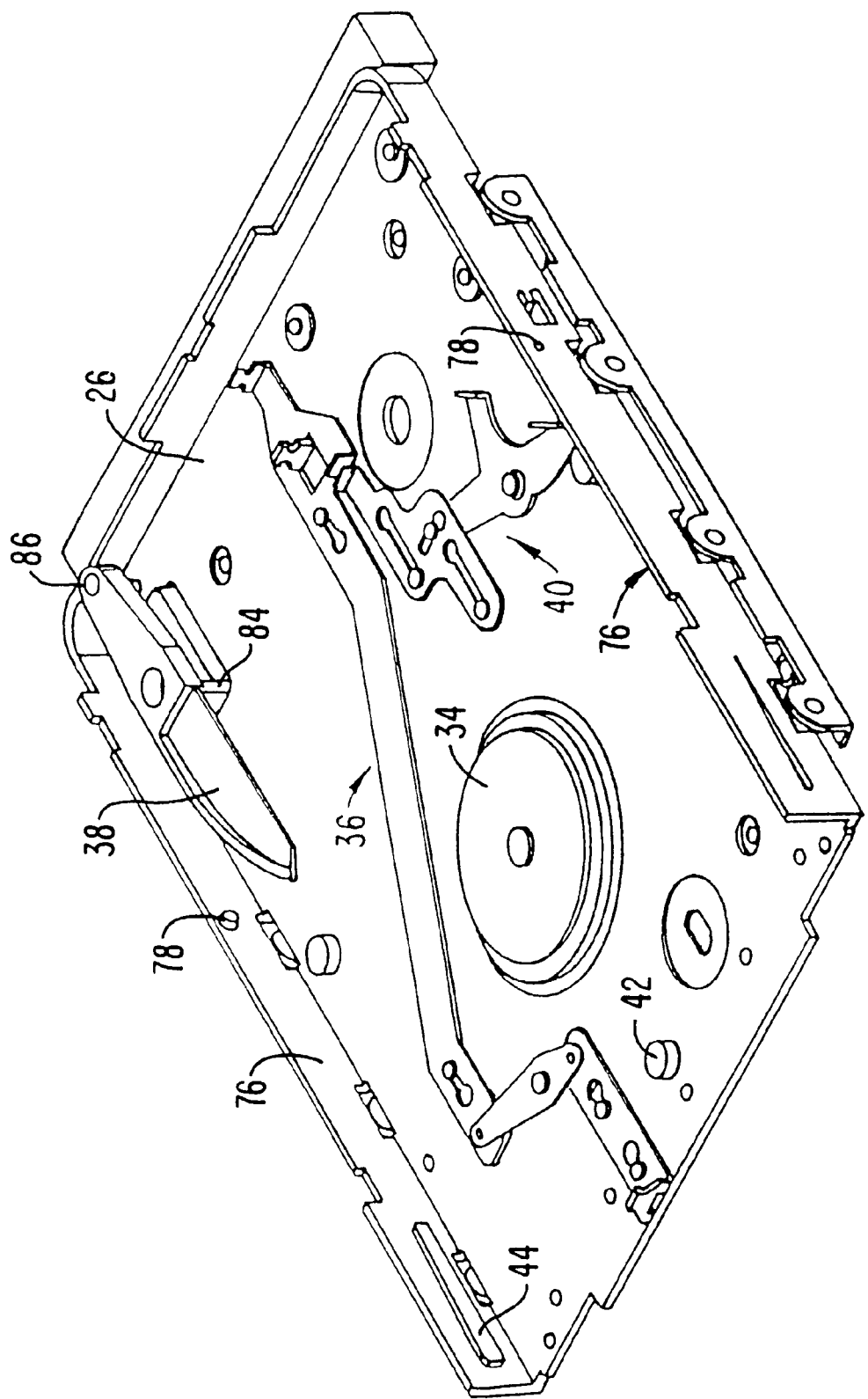
FIG. 4 is a simplified perspective view of the internal drive of FIG. 2, in which the voice coil motor and arm have been removed to show the cartridge release linkage and the head retract linkage.

Side edges 74 of cartridge 60 are fittingly received between side walls 76 of base 26, as illustrated in FIG. 4. This generally helps maintain the lateral position of cartridge 60 within base 26 throughout the insertion process. Stops 78 in sidewall 76 stop forward motion of the cartridge once the hub of disk 66 is aligned with spindle drive 34, at which point rails 44 are also aligned with rear indents 72. Hence, the cartridge drops roughly vertically from that position, which helps accurately mate the hub of the disk with the spindle drive.

Figure 5A:
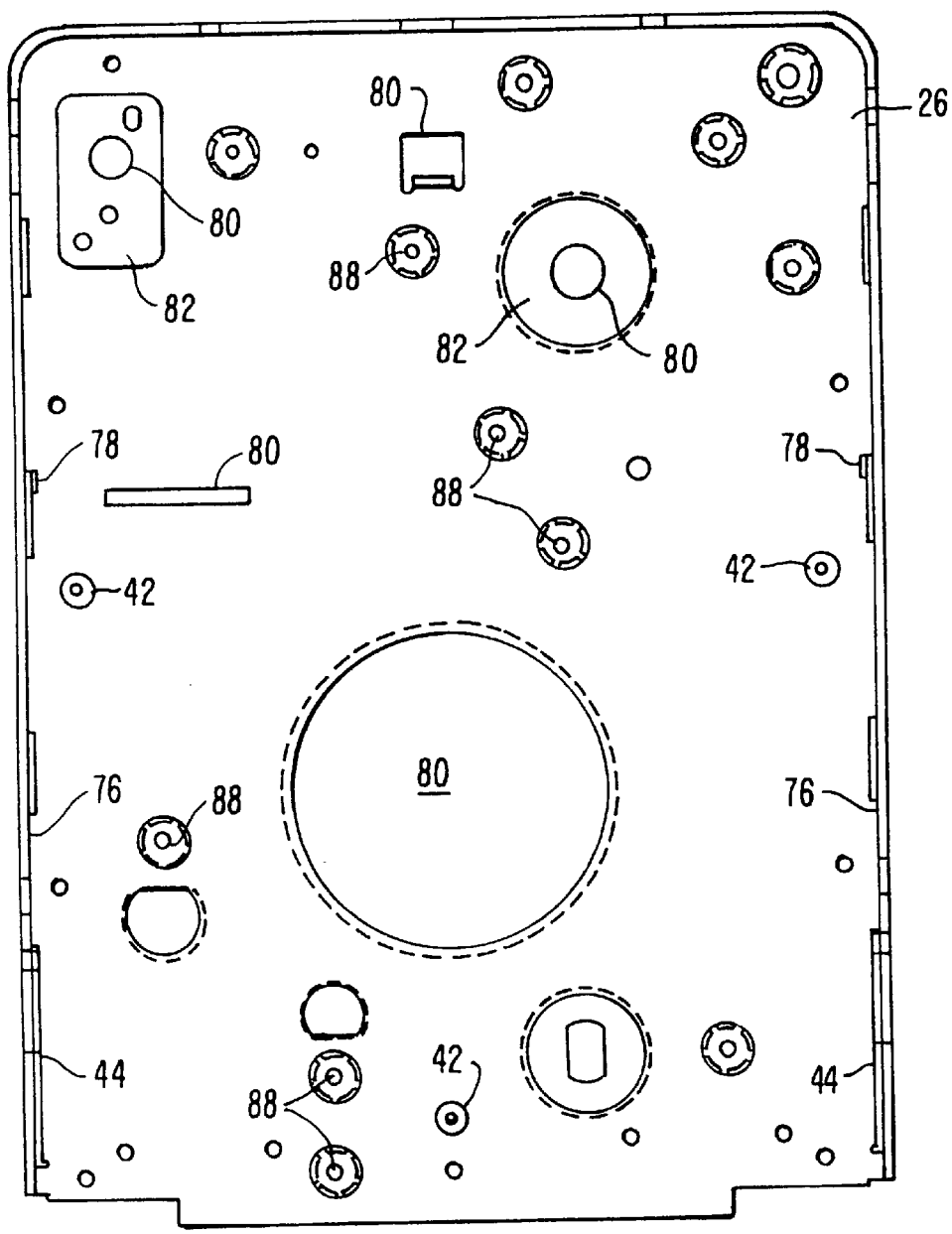
FIG. 5A is a top view of a base for the internal drive of FIG. 2, in which the base is substantially entirely formed from sheet stock in a single stamping process.
Figure 5B:
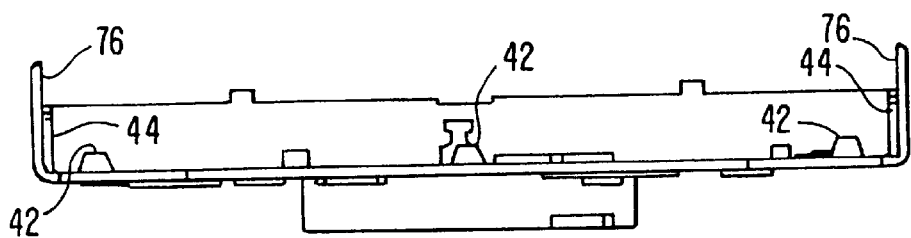
FIG. 5B is a front view of the base of FIG. 5A.
Figure 6A:
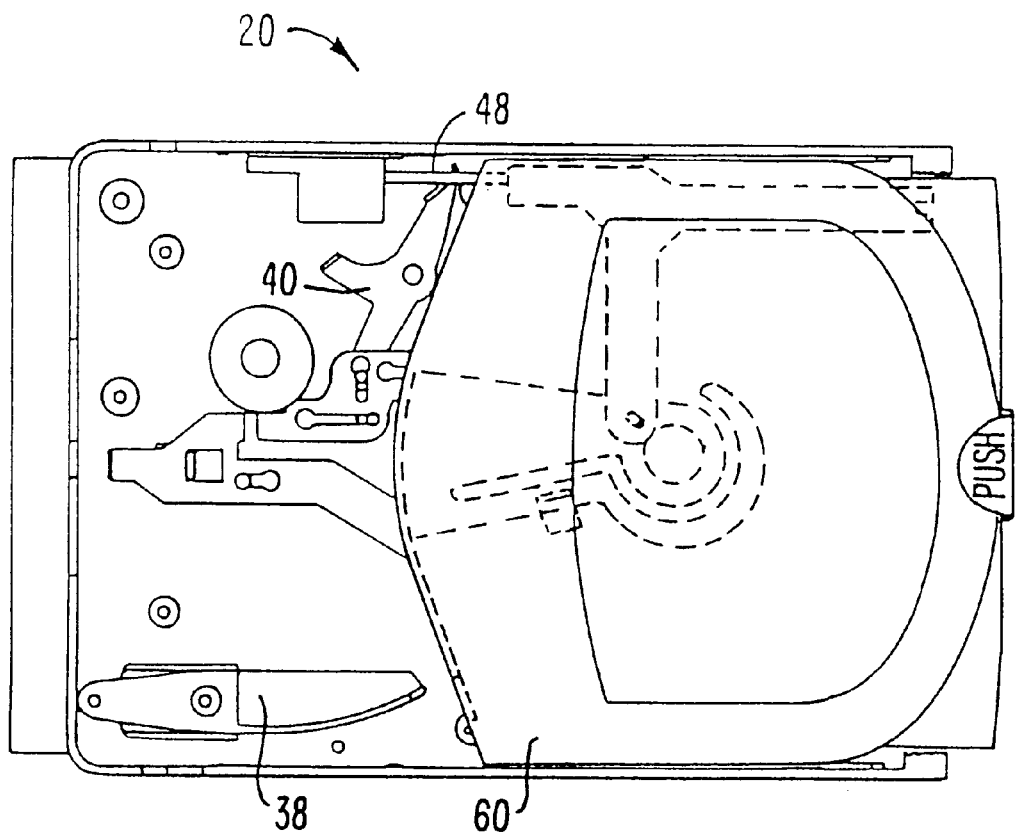
FIG. 6A is a top view of the internal drive of FIG. 1B, in which the cover has been removed to show insertion of the cartridge of FIG. 3 therein.

The structure of base 26 can be seen most clearly in FIGS. 4, 5A, and 5B. Base 26 generally comprises a stamped sheet metal structure, ideally being formed of stainless steel. Openings 80 accommodate the spindle drive, data transmission cables, component mounting fasteners, and the like. Openings 80 are substantially formed during the stamping process, but may optionally be modified afterward to provide threaded openings, etc. Mounting pads 82 are also generally defined by the stamp tools, so that head load ramp 38, the head support structure (which generally includes voice coil motor 30 and head support arm 50, as illustrated in FIG. 2), and spindle drive 34 are substantially located relative to each other.

Bosses 42 and side wall 76 are also formed by clamping the sheet metal stock between the male and female tool parts, while side rails 44 and stops 78 may be formed by independently movable tool portions. Hence, the cartridge engaging surfaces and component mounting pads are positioned on base 26 simultaneously during the relatively rapid stamping process, rather than individually machining each of these surfaces.

Once base 26 is stamped to shape, the various components may be mounted to the base to assembly the disk drive. Voice coil motor 30 and arm 50, which together support head 32 (see FIG. 2) are mounted directly to their associated pad 82. Spindle drive 34 will then be bonded to the base material which extends downward from its associated opening 80. The driving member will rotate about a fixed position, rather than telescoping axially to engage the disk within the cartridge. The position of the spindle drive assembly can be adjusted during the bonding process using a gauge to align the disk on the spindle drive with the motion of heads 32.

Head load ramp 38 is also mounted on an associated stamped pad 82 of base 26. The head load ramp will preferably flex about a central fulcrum 84. This facilitates adjustment of a height of the head load ramp over the base using a rear screw 86, as more fully described in co-pending U.S. patent application Ser. No. 08/970,282, (Attorney Docket No. 18525-000800) and assigned to the present assignee, the full disclosure of which is incorporated herein by reference. This allows the height of the head load ramp adjacent the disk to be easily adjusted so as to smoothly transfer the heads between the recording surface and a "park" position along the head load ramp.

Also formed during the stamping process are linkage mounts 88. Release linkage 36 and head retract linkage 40 will be mounted to linkage mounts 88 using rivets or other fasteners which accommodate the sliding and/or pivoting of the linkage members, as appropriate.

Heads 32 will often be separated from the spinning recording surface by a thin layer of air. More specifically, the data transfer head often glides over the recording surface on an "air bearing," a thin layer of air which moves with the rotating disk. Although recording densities are generally enhanced by minimizing the thickness of this air bearing, often referred to as the glide height, glide heights which are too low may lead to excessive contact between the head and the disk surface, which can decrease the reliability of the recording system. To avoid a head crash (in which the data transfer head contacts and damages the disk), the disk drive system of the present system will generally position heads 32 on head load ramp 38 whenever the disk is rotating at insufficient velocity to maintain a safe glide height.

Referring now to FIGS. 6A–7B, arm 50 pivotally supports heads 32. When no cartridge is disposed in internal drive 20 and no power is supplied to voice coil motor 30, biasing springs of head retract linkage 40 and release linkage 36 urge arm 50 to a parked position on head load ramp 38. As cartridge 60 is inserted into the receptacle of internal drive 20, the cartridge actuates head retract linkage 40 so that the voice coil motor is free to pivot the arm from the parked position.

During insertion, cover springs 28 urge forward edge 62 of cartridge 60 downward, while rear edge 64 remains elevated (so long as the cartridge rides along rails 44) as cartridge 60 slides into the receiver, biasing spring 90 attached to head retract linkage 40 is tensioned. Biasing spring 102 is generally overcome manually during insertion of the cartridge.

Once cartridge 60 is inserted so that disk 66 is substantially aligned axially with spindle drive 34, rear side indentations 72 (see FIG. 3) allow rear edge 64 of the cartridge to drop downward below rails 44. This downward movement is opposed by base springs 94. These base springs generally comprise simple wire structures screwed or otherwise fastened to base 26, and the upward urging force imposed on cartridge 60 by the base springs is again manually overcome during insertion.

As base springs 94 are compressed against base 26, latch 46 slides into detent 80, so that the latch restrains cartridge 60 within the receiver of internal drive 20. Simultaneously, spindle drive 34 aligns with and engages the hub of disk 66, with centering alignment and driving engagement between the spindle drive and the disk generally being facilitated by a protruding, tapering nose on a magnetic chuck of the spindle drive and a corresponding counter sunk armature at the hub of disk 66.

As described hereinabove, the door of the cartridge opens automatically during insertion of the cartridge. Actuation of head retract linkage 40 during insertion also frees arm 50 to move heads 32 from head load ramp 38 to recording surfaces 92 along the major surfaces of disk 66.

While cartridge 60 is disposed within the receptacle of drive 20, the position of the cartridge is generally maintained by engagement between the surfaces of the cartridge and the stamped surfaces of base 26. More specifically, cover springs 28 and latch 46 hold cartridge 60 in contact with bosses 42, thereby ensuring alignment between the major surfaces of the cartridge and the disk drive structure. The fore and aft position of the cartridge is generally maintained by engagement between side rails 44 and rear indentation 72, with head retract linkage 40 biasing these two elements against each other. As described above, the sidewalls of base 26 fittingly receive side edges of cartridge 60, so that the position of the cartridge within the receptacle is substantially fully constrained. The tolerance of the positioning of the cartridge within drive 20 should be sufficient so that the disk within the cartridge is rotatable within the cartridge housing, and so that the heads (as supported by the head support structure) have free access to the recording surfaces of the disk.

As described above, cartridge 60 is held in the receiver of internal drive 20 by engagement of latch 46 with detent 70. Voice coil motor 30 may effect release of the cartridge by engagement between a tab of arm 50 and a corresponding tab on release linkage 36. Expulsion of the disk from the receptacle of internal drive 20 is effected after the disk has spun down with heads 32 safely parked along head load ramp 38. Voice coil motor 30 actuates release linkage 36 so as to disengage latch 46 from detent 80.

When the latch is disengaged, engagement between rails 44 and indents 72 initially prevents the cartridge from sliding along the plane of the disk. Instead, base springs 94 urge rear edge 64 of cartridge 60 upward, disengaging spindle drive 34 substantially axially from the hub of the disk. Once these driving structures are safely disengaged, biasing spring 90 of head retract linkage 40 urges cartridge 60 out of the receiver, and the head retract linkage also ensures that arm 50 is safely positioned with heads 32 along head load ramp 38. Generally, the biasing system will slide the cartridge rearward so that a portion of the cartridge extends from the drive, and so that the cartridge can be easily manually removed and replaced by the user.

Figure 8A:
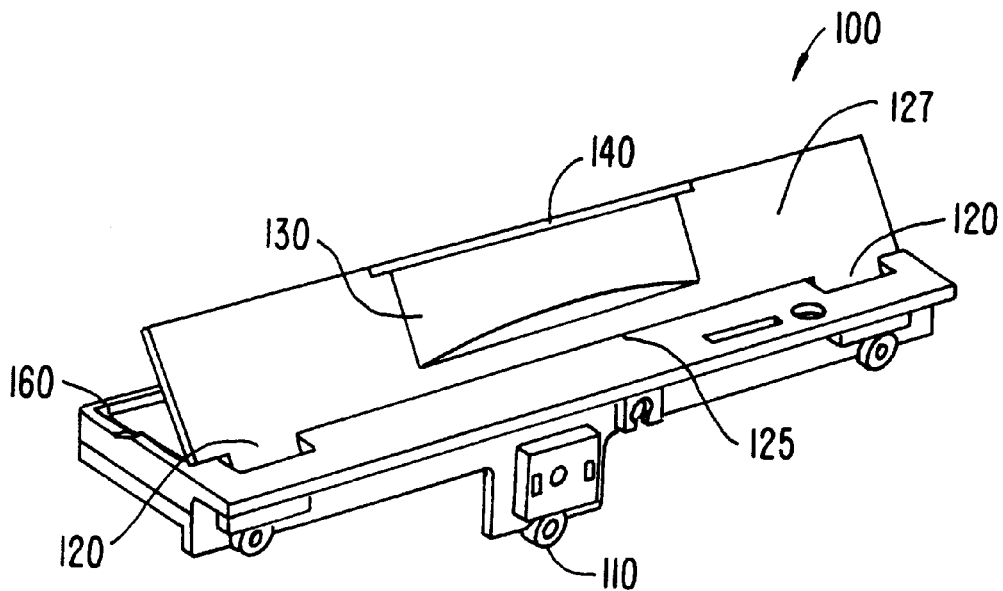
FIGS. 8A–8B are perspective views of the access panel according to an embodiment of the present invention.
Figure 8B:
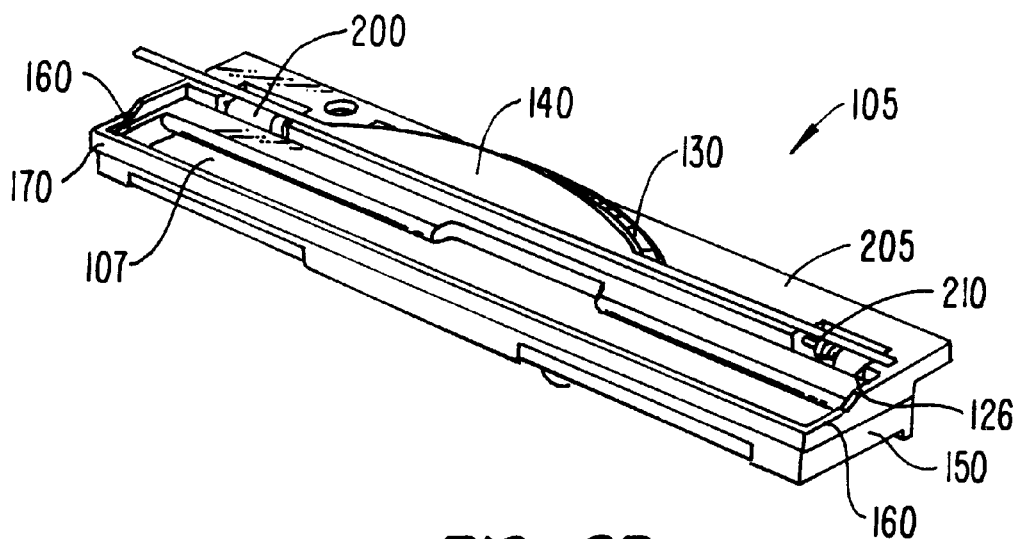

An apparatus to provide protection to the internal mechanisms of internal drive 20 is illustrated in FIGS. 8A and 8B. Generally, the apparatus has a fastening frame 105 which can be secured to the access or receiving end of the internal drive 20. The device also has an access portion 107 to provide a throughway to the internal mechanisms of the drive 20 and an entry means for the cartridge 60. To enclose the internal drive access portion, an access panel 100 is disposed over the access portion. The access panel 100 has coupling members 120 for supporting the access panel on the fastening frame 105. The access panel 100 is adapted to be flush mounted with a front face 205 of the fastening frame 105. To provide clearance to the cartridge 60 after it has been inserted into the drive system, a recess means 130 is defined on the access panel.

In a specific embodiment, the fastening frame 105 has an access portion 107 and lateral walls 150. The lateral walls are formed by lateral strips of material disposed inward of the access portion 107. The lateral strips can be buttressed against portions of the base plate 26 and the cover 24 to provide closure to the cartridge insertion portion of the internal drive 20. The frame 105 may be attached to the internal drive 20 using an adhesive, such as glue, or any other conventional means of attachment. The fastening frame 105 may be manufactured into any shape or form necessary to fit the access portion of the internal drive 20. The lateral strips on the fastening frame have a recessed portion 160 disposed at inner sides of the access portion 107, which follow along the periphery of the fastening frame 105. The recessed portion captures the access panel 100 when it is in the closed position. This further allows the access panel to be flush mounted with the surface 205 of the fastening frame.

The access panel has at least two coupling members 120 which extend down from a bottom edge 125 of the panel. The front surface of the coupling members is maintained flush with a front surface 127 of the access panel 100. The access panel 100 and the coupling members 120 are elements of a unitary part, most likely made of molded plastic or a similar material. The back face 126 of the coupling members 120 have a receptacle for allowing insertion of a pivot mechanism, such as a pivot rod 200. The access panel 100 rotates rearwardly with the pivot rods 200 defining the axis of rotation. Specifically, the receptacle may be a bushing or similar structure, which accepts insertion of the pivot rod 200 to provide pivotable movement. A biasing device 210, for example a spring, may also be coupled to the pivot rod to apply a force to the access panel biasing the panel in a closed position. The pivot rods 200 are disposed in a recess or cavity from the front face 205. The coupling members 120 and the pivot rods 210 when coupled together form a hinge which supports the access panel and provides pivotal movement about the axis of rotation.

To combine the access panel and the fastening frame, the bushings 126 of the coupling members 120 are placed into the cavity. The pivot rods 200 are then inserted into the bushings 126. This configuration allows the front face of the access panel 127 to be made flush with a remainder of the front face 205 or outward surface of the fastening frame. An access panel with flush hinges provides the internal drive 20 a sleek shape that has substantially no protruding hinge parts, thus making the internal drive 20 much easier to place in an external drive 10 or any other housing or a standard bay of computers.

In another embodiment, the access panel has a recess means 130 for providing clearance to the rear edge 64 of the cartridge 60 (See FIG. 3). The recess means is a raised portion or cavity formed on the outer surface 127 of the access panel 100. The cavity can be formed, extruded, or stamped into any shape necessary. Advantageously, it can be substantially arc shaped so it can easily receive the rear portion 64 of the cartridge 60 described above. The arc 130 may extend substantially parallel to a peripheral edge 170 of the fastening frame 105 or in any manner which allows for maximum clearance. In any configuration, the access panel 100 is received into the recessed areas 160 of the fastening frame so that the door will be deemed completely closed. The recess means allows a portion of the cartridge 60 to project out from the access portion 107 of the fastening frame 105. Often, the cartridge 60 is secured into the internal drive 20. By allowing a portion of the cartridge 60 to extend beyond the access portion, a user's finger does not have to be inserted into the internal drive 20.

In yet another embodiment, tab 140 can be provided which extends out from the front face 127 of the access panel 100. The tab 140 can be located for example along the top edge 141 of the access panel or above the recessed area 130 and can be made to conform to the shape of the recessed area for aesthetic purposes. The tab helps to manually overcome the biasing spring 210 to open the access panel.

While the exemplary embodiment has been described in some detail, by way of example and for clarity of understanding, a variety of modifications, changes, and adaptations will be obvious to those of skill in the art. Therefore, the scope of the present invention is limited solely by the appended claims.

What is claimed is:

1. A removable disk system comprising:
   a cover, a base and side walls defining a housing, the housing having a front and rear end;
   a head assembly, a spindle motor and a cartridge receiving portion for receiving a cartridge in the housing;
   a fastening frame on a front end of the housing having a front face outside of the housing and an access portion that receives the cartridge from outside of the housing to the cartridge receiving portion in the housing;
   an access panel having a front face outside the housing and closing the access portion in a position substantially perpendicular to the base of the housing;
   at least one coupling member having a front face outside of the housing and supporting the access panel, the front face of the coupling member are substantially flush with the front face of the access panel and with the front face of the fastening frame when the access panel closes the access portion;
   a recess means including a cavity on the access panel inside the housing and a raised portion protruding on the access panel outside the housing providing a clearance for the cartridge projecting out from the access portion of the fastening frame into the cavity of the access panel when the access panel closes the access portion.

2. The apparatus of claim 1, wherein the fastening frame comprises at least one pivot rod disposed in another cavity on the front face of the fastening frame and and receive the coupling member to provide pivotal movement about an axis of rotation.

3. The apparatus of claim 2, wherein the access panel rotates rearwardly with the pivot rod defining an axis of rotation.

4. The apparatus of claim 1, wherein the recess means define an outer curved surface which extends substantially parallel to a peripheral edge of the fastening frame for providing clearance to a rear edge of a cartridge inserted therein.

5. The apparatus of claim 4, wherein the outer curved surface is substantially arc shaped.

6. The apparatus of claim 1, further comprising at least one tab extending from the access panel.

7. The apparatus of claim 1, wherein the access panel and the coupling members are portions of a unitary part.

8. The apparatus of claim 1, wherein the fastening frame comprises a means for attaching the apparatus to a disk drive system.

9. The apparatus of claim 1, further comprising a means for biasing the access panel in a closed position.

10. Apparatus for use with a disk drive system, the apparatus comprising:

a cover, a base and side walls defining a housing, the housing having a front and rear end;

a head assembly and a spindle motor in the housing;

a fastening frame having an access portion and lateral walls, the lateral walls forming lateral strips disposed inward of the access portion and having inner recesses disposed along all of the inner sides of the access portion;

a receptacle inside the housing attached to the fastening frame, the receptacle seating a cartridge inserted through the access portion with a rear edge of the seated cartridge extending out of the access portion;

an access panel closing the access portion in a closed position that is substantially perpendicular to the base of the housing and received within all of the inner recesses of the fastening frame, the access panel having at least one coupling member extending from a bottom edge and flush with a front surface of the access panel;

a hinge supporting the access panel and providing pivotal movement about an axis, the hinge being mounted below the access portion of the fastening frame, the hinge includes pivot rods pivotally coupled to at least one of the lateral walls of the fastening frame, the coupling member coupled to the pivot rods and flush with an outward surface of the fastening frame;

a recess means including a cavity on the access panel inside the housing and a raised portion protruding on the access panel outside the housing providing a clearance for the rear edge of the cartridge extending out from the access portion of the fastening frame into the cavity of the access panel when the access panel closes the access portion; the recess means further defining an outer curved surface which is substantially arc shaped and extends substantially parallel to a peripheral edge of the fastening frame; and a means for biasing the access panel in the closed position.

* * * * *